March 7, 1944.  C. M. CONRADSON  2,343,367
POWER BELT CONSTRUCTION
Filed March 1, 1939  3 Sheets-Sheet 1

INVENTOR.
Conrad M. Conradson
BY
Barnes, Kisselle, Laughlin & Raisch
ATTORNEYS

March 7, 1944.　　　C. M. CONRADSON　　　2,343,367
POWER BELT CONSTRUCTION
Filed March 1, 1939　　　3 Sheets-Sheet 2
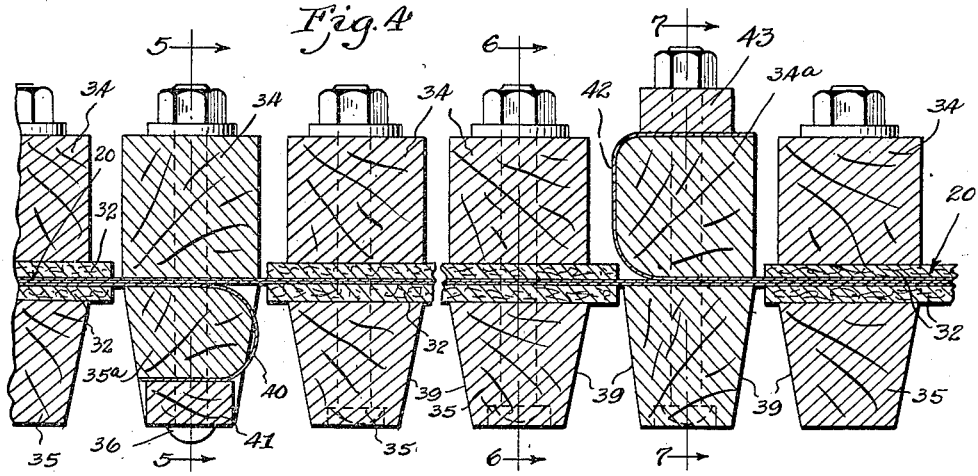
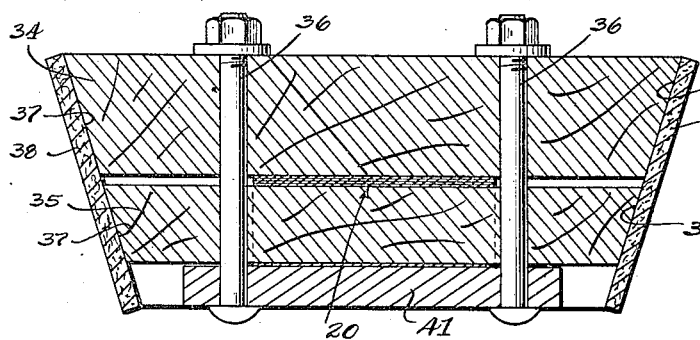
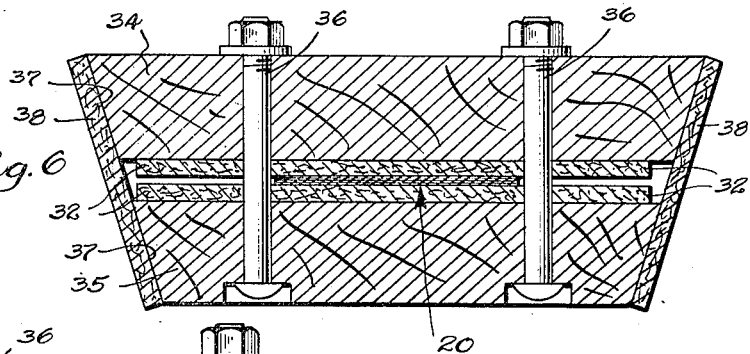
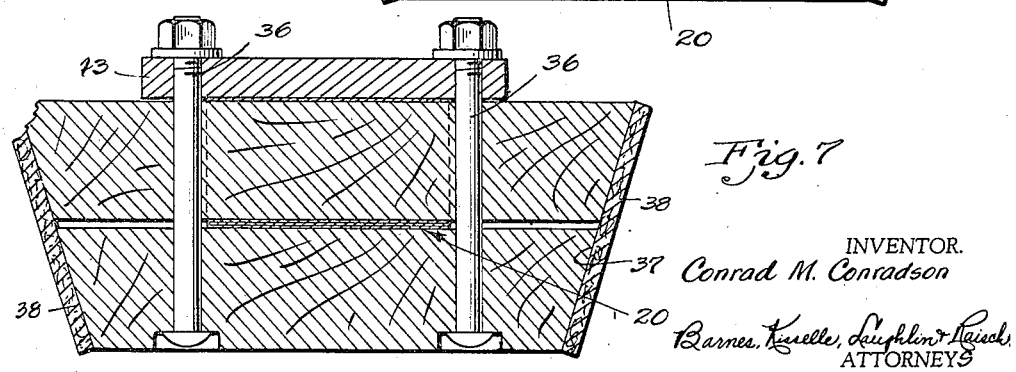
INVENTOR.
Conrad M. Conradson
Barnes, Kisselle, Laughlin & Raisch
ATTORNEYS March 7, 1944. C. M. CONRADSON 2,343,367
POWER BELT CONSTRUCTION
Filed March 1, 1939 3 Sheets—Sheet 3
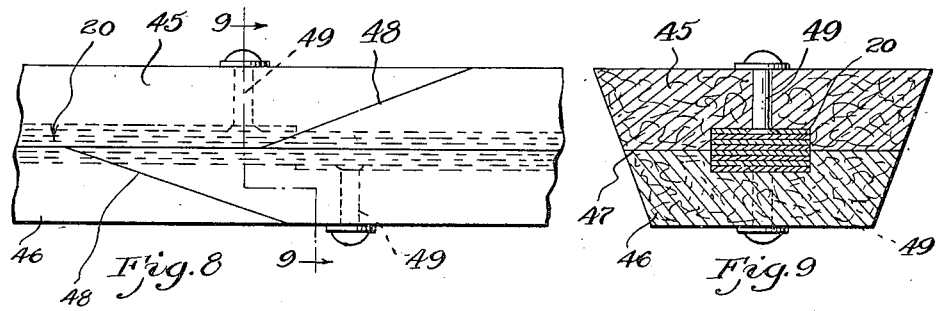
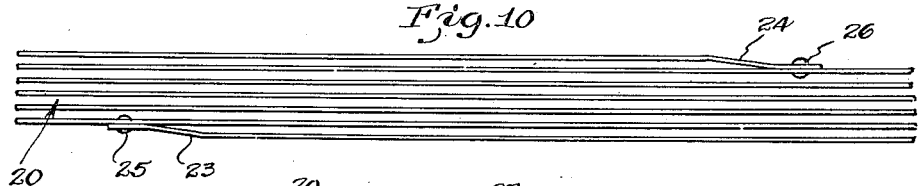
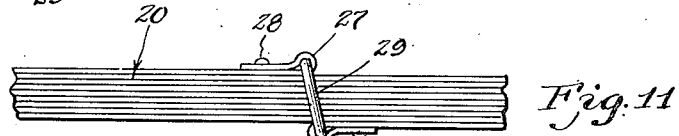
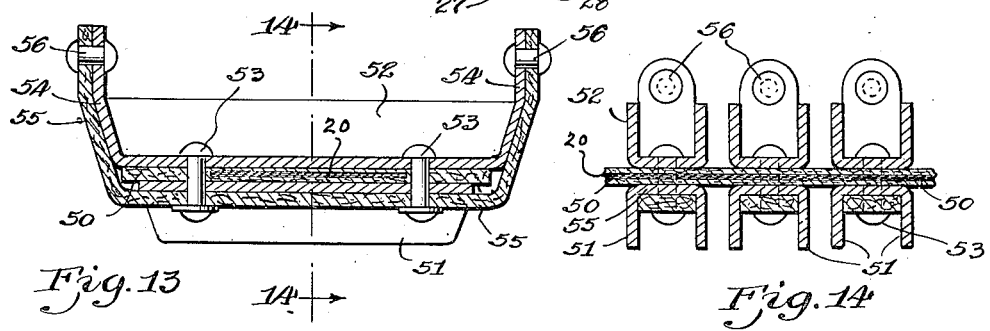
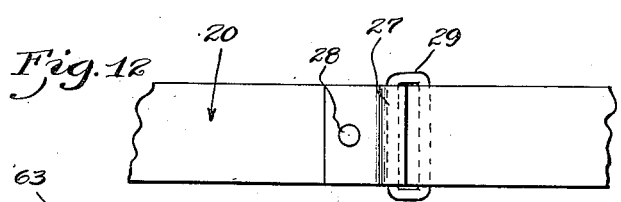
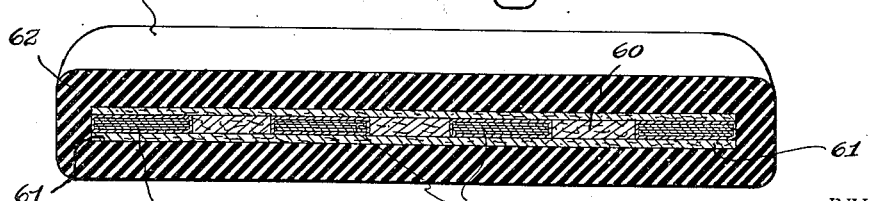
INVENTOR.
Conrad M. Conradson
BY
Barnes, Kisselle, Laughlin & Keusch
ATTORNEYS Patented Mar. 7, 1944

2,343,367

UNITED STATES PATENT OFFICE 2,343,367

POWER BELT CONSTRUCTION

Conrad M. Conradson, Detroit, Mich.; Frederick R. Walter, administrator of said Conrad M. Conradson, deceased, assignor, by mesne assignments, to Oscar Christianson, Madison, Wis., as trustee Application March 1, 1939, Serial No. 259,117

7 Claims. (Cl. 74—237)

This invention relates to power belt construction and has particularly to do with an improved center or reinforcing means for a belt.

Many attempts have been made to design a stretchless belt for the transmission of power. In some of these attempts a metal reinforcing means has been utilized. However, the problems met in this regard have been twofold: first, when the metal was made heavy enough to stand the required tension, the metal would be subject to fatigue wear as it was passed over the pulleys; second, the joining of the metal reinforcing means has presented a seemingly insurmountable problem.

It is well known that a high grade of strip steel will withstand belt use if not too thick and if used on pulleys of sufficiently large diameter. For example, a steel band saw stands up very well, the weakest spot being the welded joint therein. If a certain relationship is maintained between the diameter of a wheel being used and the thickness of the band, satisfactory results may be had without the elastic limit of the steel being exceeded.

It is an object of the present invention to provide a metal reinforcing means for a belt which will be stretchless and not subject to fatigue wear.

A further object is to provide a metal center belt in which the metal is so joined that there is no possibility of joint failure. An additional object is to provide a reinforced belt which may be utilized on pulleys of small diameters and which will yet have sufficient tensile strength to carry a high load.

A further object of the invention is a belt construction which is especially adapted for use on variable speed mechanism of the type where a side bearing V-belt contacts on its inclined edges with suitable conical pulleys. On this type of mechanism at the present time it is the practice in some cases to provide a plurality of V-belts to carry the load. This is necessary since the belts, because of their lack of strength, cannot be tightened to carry the load alone. With the present invention sufficient tension may be maintained on the belt that a single belt may serve to carry the necessary load.

An added feature of the invention has to do with the adaptability of the invention to heavy duty belts where several individual reinforcements may be used in a single belt. Due to the stretchless quality of the belt, it is possible to use several reinforcements without the danger of one element taking the entire load. This heavy duty belt is especially adapted for use on Caterpillar tractors and other similar devices.

The present invention contemplates a new mechanical unit which consists of a thin steel strip wound upon itself to form a laminated band, the ends being fastened in several possible ways. One type of belt is shown in connection with a variable speed mechanism which is particularly designed to cooperate with the new belt. The cooperative relationship of the two elements will be brought out later.

Other objects and features of the invention have to do with detail modifications and construction and with the theory of operation as will be set forth in the following description and claims.

In the drawings:

Fig. 4 is a longitudinal section of a portion of a modified form of a belt illustrating the manner in which the ends of the convolute strip are fastened.

Figs. 5, 6 and 7 are transverse sections taken on the lines 5—5, 6—6 and 7—7, respectively, of Fig. 4.

Figs. 8 and 9 are views of another modification of a belt showing the manner in which the ends of the convolute strip are fastened.

Figs. 10, 11 and 12 illustrate various ways of fastening the ends of the metal band.

Fig. 13 is a modified form of belt wherein the metal reinforcement is surrounded by spaced metal contact bars.

Fig. 14 is a section taken on the lines 14—14 of Fig. 13.

Fig. 15 is a sectional view of a composite belt particularly adapted for heavy duty.

As before stated, there have been attempts made to provide metal belts and metal reinforcements. Difficulty has been had, however, with fatigue wear and joint failure. The present invention contemplates a removal of both of these problems by the formation of a convolute band of thin strip steel.

In wrapping a metallic band around a cylinder there is set up an elongation strain at the outer surface and a compression strain at the inner surface. Assuming a steel strip .003 inch thick is wrapped around a 3.747 inch wheel, the total elongation from the center of the band to the outside will be about .0094 inch. The unit strain $e$ equals .0094 divided by the outside circumference which is 11.7904 inches. Thus $e$ equals .008. The unit stress may be determined by multiplying the coefficient of elasticity, 30,000,000, by the unit strain and is found to be 24,000 pounds per square inch. This is well within the elastic limit of a high grade steel, as for example, Swedish steel which has an elastic limit of at least 75,000 pounds per square inch. Consequently, the stress set up in a strip of steel in bending it about a cylinder having a diameter 1250 times its thickness is 24,000 pounds per square inch. In actual practice, also, I have found that the above figures are very satisfactory and well on the safe side.

The present invention contemplates solving the problem of a suitable joint in a number of ways. Of course, by forming a convolute band, the joint problem is immediately solved to a great extent because it becomes necessary then only to fasten the ends of the strip in a satisfactory manner. Because of the friction between the plies, the great strain which exists on the joint of a single ply band is not present on the end joints of the convolute band.

Figure 1:
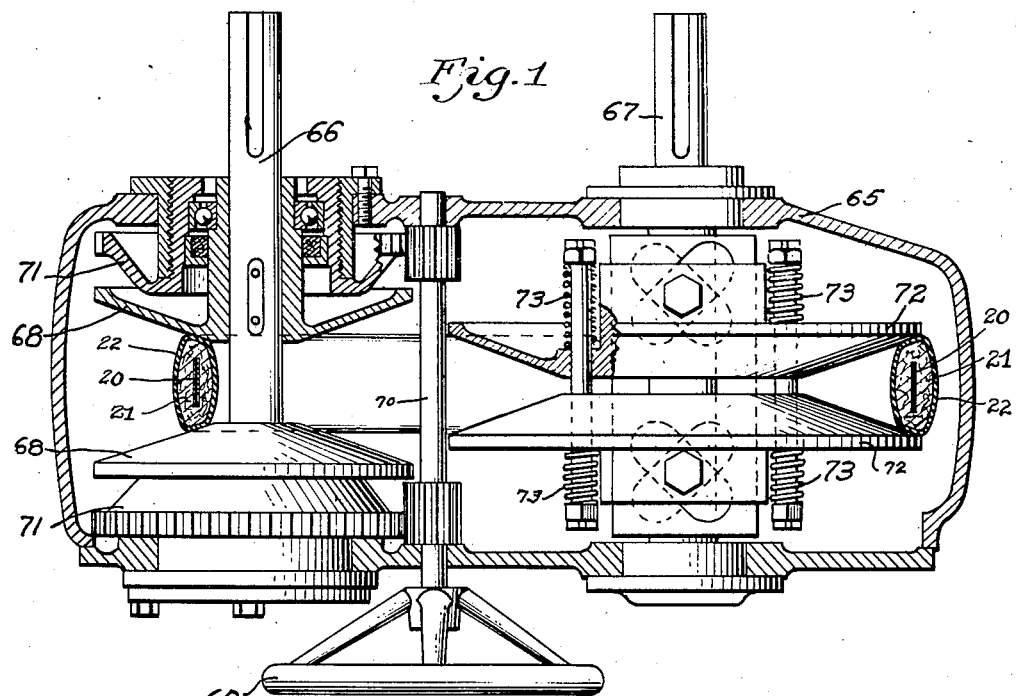
Fig. 1 is a plan view, partly in section, of a variable speed motor adapted to be used in combination with a reinforced belt.
Figure 2:
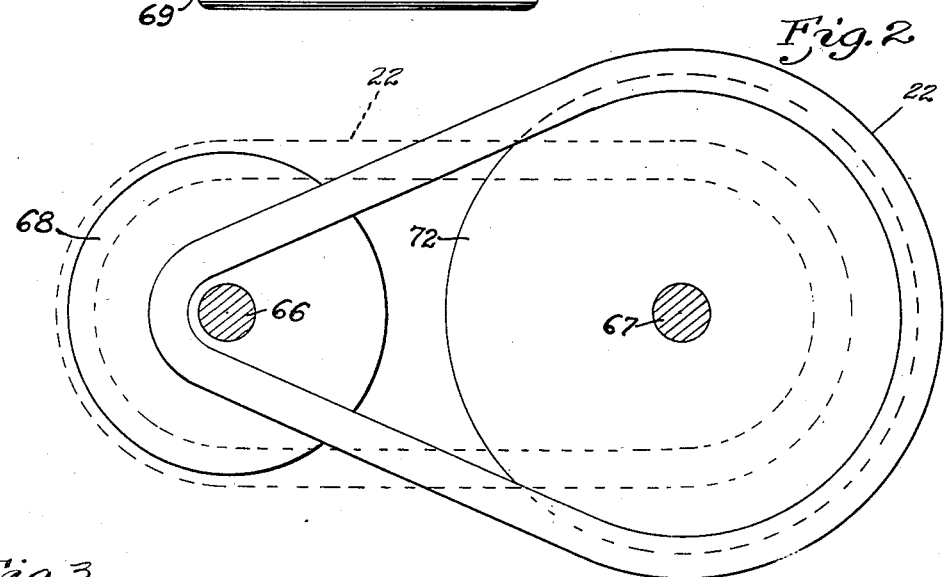
Fig. 2 is a side view of the motor showing just the belt and the relative positions it may assume.
Figure 3:
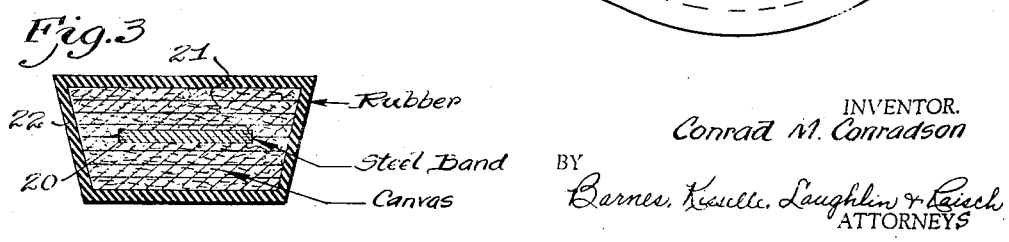
Fig. 3 is a cross section of a type of belt illustrating the present invention.

Referring to the drawings, in Fig. 2 is shown a belt which consists of a metal reinforcement and a covering material adapted to contact the pulleys on which the belt is used. Due to the fact that the steel strip which is to form the convolute metal reinforcing band is so extremely thin, it is somewhat difficult to illustrate the exact dimensions of the band in the drawings. This band is shown at 20 in Figs. 1, and 3 to 14. The belt, as shown in section in Figs. 1 and 3, consists of the metal band 20, a covering of strip canvas shown at 21 and an outer covering of rubber 22. The ends of the multiplex steel band, which is formed by winding upon itself a long thin steel strip having a predetermined thickness, may be fastened as shown in Fig. 10. In Fig. 10, for purposes of illustration, the plies of the convolute band have been shown as separated and the thickness exaggerated. The band has two ends 23 and 24 and these are fastened by rivets 25 and 26 to an adjacent ply of the band. Once the metal reinforcement band is formed, the outer covering of canvas and rubber may be applied just as is now common in belt construction. The metal reinforcing band 20 is, of course, preferably made of a high grade steel such as Swedish steel and, as previously pointed out, the thickness of the strip which is utilized to form the band, will be dependent on the diameter of the pulley upon which the belt is to operate. It has been found satisfactory to utilize a strip which has a thickness relative to the diameter of the pulley as 1 is to 1250. However, it is necessary only to calculate the stress in a particular ply of the band as it is bent around the pulley to determine whether or not the maximum stress of the steel would be exceeded.

The number of plies which are utilized in each band is dependent somewhat on the load which is to be borne by the belt in which the band is used. It will be seen that the greater the number of turns in the convolute band the greater will be the frictional resistance of the band to enlarging and the less will be the strain on the end rivets 25 and 26. Most satisfactory results have been obtained with bands having from 8 to 12 plies. Of course, each additional ply increases the friction and necessarily the power capacity of all the plies beneath it.

Another manner of fastening the ends of the convolute band is shown in Figs. 11 and 12. In this form the ends of the band are bent upon themselves to form loops 27, the ends of the band being riveted at 28. Through the loops is then passed a ring 29 which holds the loops against slipping.

In Figs. 4 to 7 the stretchless belt is shown in connection with transverse blocks adapted to provide contact surfaces and to form the belt. A leather or fiber covering 32 is provided on each side of the convolute band 20. Blocks of wood or other suitable material are then bolted, as shown, transversely of the band. Blocks 34 are fastened on the outside of the band and blocks 35 on the inside. Each block 34 is paired with a block 35 and bolts 36 pass therethrough on each side of the band. Each of the blocks 34 and 35 are beveled at the ends 37 so that the belt may serve as a side contact belt. On the beveled edge of the belt will be cemented a strip of leather 38 which will serve to contact the sheaves of the pulleys. As will be seen in Fig. 4, the inside blocks 35 have their facing surfaces beveled as at 39 so that as the belt passes around the pulley the blocks may be annularly displaced toward each other without causing a strain on the band. Referring to Fig. 4, a block 35a is shown with a slightly different formation than the blocks 35. This block is used to fasten an inner end 40 of the convolute band. The end 40 is bent around and fastened at the bottom of the block by a bar 41 which is held tightly against the block 35a by the bolts 36. Similarly, a block 34a serves to fasten the outer end 42 of the band 20. This outer end is bent around the block 34a and fastened tightly to the top thereof by a bar 43. In the operation of this belt there is little or no force exerted at the ends of the strip as the mutual friction between the plies of the strip is so great that all of the working tension is taken up.

In Figs. 8 and 9 a modified form of the belt is shown in which the band 20 is covered by casings 45 and 46. These casings may be formed of leather or other similar flexible material and are joined at 47 so that the band 20 is completely surrounded. If the belt is to be used on a side friction pulley, the casings may be beveled as shown in Fig. 9. The ends of the casings 45 and 46 are joined at 48 by cementing or other type of fastening. In this embodiment, the ends of the convolute band are fastened directly to the casing by rivets 49 on which the inner end is flat.

Another embodiment of the invention which is particularly adapted for a side contact belt is shown in Figs. 13 and 14. The belt is first covered with a vulcanized canvas or leather 50 and then steel pressings 51 and 52 are applied transversely in pairs on the belt. These pressings are riveted together by rivets 53 and the upper pressings 52 are provided with side flanges 54, as shown in Fig. 13. On the sides and bottom of the pressings a leather strip 55 is then riveted, the ends being held by rivets 56 and the middle being held by the previously mentioned rivets 53. This leather will serve as a contact surface for the belt. In this modification the ends of the convolute band may be fastened as shown in Figs. 10 and 11 or simply left free on the band since the friction of the various elements will be sufficient to hold the band in its convolute position.

The invention is especially adapted for use on heavy duty belts, since there is no possibility of the reinforcing band stretching. In Fig. 15 is shown a section of a composite belt in which a plurality of bands are utilized side by side in one belt. The belt shown in section in Fig. 15 is particularly adapted for use on a caterpillar tractor where continuous belts are used for the traction elements. In the section shown in Fig. 15 each steel reinforcement band shown at 20a is preferably surrounded by vulcanized fiber wrapping. The belts are then spaced by a suitable fiber material 60 and held together by a vulcanized wrapping 61. This entire reinforcing unit may then be utilized in a tractor belt by providing transverse members to contact the driving wheels of the tractor. In the modification shown, I have illustrated the reinforcement in connection with a molded rubber belt 62 provided with transverse bars 63 which are spaced to form diagonal channels to receive the lugs of the driving wheels. These bars serve also on the outside to provide the necessary traction.

In Fig. 1, one modification of the belt is shown in conjunction with a variable speed device. This device consists of a housing 65 in which are mounted two shafts 66 and 67. On the shaft 66 are slidably mounted two pulley sheaves 68 which may be moved toward or away from each other by the use of a hand wheel 69 and a shaft 70. This shaft 70 operates through suitable gearing to screw plates 71 which serve as bearings for the sheaves 68. The other pulley in the variable speed device consists of sheaves 72 which are slidably mounted on shaft 67 and which are urged toward each other by springs 73. The sheaves 72 are arranged so that they will separate automatically in case the effective diameter of the other pulley, composed of the sheaves 68, is increased. In this way the speed ratio of the two pulleys may be easily changed by the use of the hand wheel 69. This type of speed device is very satisfactory when used with a belt, as above disclosed, since the tension which may be maintained on the belt will insure the proper frictional driving forces and will not result eventually in a stretched belt.

What I claim is:

1. A mechanical unit for the transmission of rotary power comprising a thin metal strip wound upon itself a plurality of times to form a laminated band, and means applied to said band to form contacting surfaces therefor when the band is used as a belt and for maintaining the convolutions of said band in tight frictional contact.

2. A belt for the transmission of rotary power comprising a thin metal strip wound upon itself to form a laminated band, and means applied to said band to form contacting surfaces therefor when the band is used as a belt and serving also to hold the ends of said strip close to the band.

3. A belt comprising a laminated band formed of a convolute metal strip and a series of blocks secured to the band at intervals in its length one of said blocks having the inner end of said strip fastened thereto and another of said blocks having the outer end of said strip fastened thereto, said blocks serving to contact pulleys upon which said belt is used.

4. A belt adapted for use on sheaved pulleys comprising a laminated band formed of a convolute metal strip and a series of wood blocks secured to said band at spaced intervals in its length, certain of said blocks serving to fasten the ends of said strip, said blocks having a width greater than said strip and being arranged in pairs, one inside and a second outside of said band, bolt means for fastening said blocks in pairs, and a fibrous material fastened to the ends of said blocks to provide a surface for contacting pulleys.

5. A belt comprising a laminated band formed of a convolute metal strip as a core and a plurality of layers of fabric material as a body applied to said band to form contacting surfaces therefor when the band is used as a belt and a covering of rubber on said fabric body.

6. A belt comprising a laminated band formed of a convolute metal strip, a facing material on each side of said strip, a series of transverse metal reinforcements spaced along said band and secured thereto, and a durable facing material on said reinforcements adapted to serve as a contact surface for said belt.

7. A belt comprising a laminated band formed of a convolute metal strip, a facing material on each side of said strip, a series of transverse metal reinforcements spaced along said band in pairs and secured thereto by rivets passing between said reinforcements along side said band, and a durable facing material on said reinforcements adapted to serve as a contact surface for said belt.

CONRAD M. CONRADSON.